US010960912B2

(12) United States Patent
Perilli et al.

(10) Patent No.: US 10,960,912 B2
(45) Date of Patent: Mar. 30, 2021

(54) STROLLER APPARATUS INCORPORATING APPARATUS FOR STEERING BY PULLING IN A LEADING OR ABREAST POSITION

(71) Applicant: Stahpen Dewitt Holdings LLC, Cherry Hill, NJ (US)

(72) Inventors: Sandra Perilli, Cherry Hill, NJ (US); Harold Chattaway, Ashby, MA (US)

(73) Assignee: Stahpen Dewitt Holdings LLC, Cherry Hill, NJ (US)

( * ) Notice: Subject to any disclaimer, the term of this patent is extended or adjusted under 35 U.S.C. 154(b) by 0 days.

(21) Appl. No.: 16/853,182

(22) Filed: Apr. 20, 2020

(65) Prior Publication Data

US 2020/0247452 A1 Aug. 6, 2020

Related U.S. Application Data

(63) Continuation of application No. 16/112,936, filed on Aug. 27, 2018, now Pat. No. 10,654,507.

(60) Provisional application No. 62/531,844, filed on Jul. 12, 2017.

(51) Int. Cl.
*B62B 5/06* (2006.01)
*B62B 5/00* (2006.01)
*B62B 9/20* (2006.01)

(52) U.S. Cl.
CPC ............ *B62B 5/067* (2013.01); *B62B 5/0016* (2013.01); *B62B 9/20* (2013.01)

(58) Field of Classification Search
CPC ....... B62B 5/067; B62B 5/0016; B62B 5/068; B62B 5/066; B62B 5/06; B62B 9/20
USPC ...................................... 280/47.371
See application file for complete search history.

(56) References Cited

U.S. PATENT DOCUMENTS

| | | | | |
|---|---|---|---|---|
| 4,470,610 A * | 9/1984 | Wilson | ............... | B62B 5/068 188/20 |
| 5,464,183 A * | 11/1995 | McConnell | ............... | B62B 9/26 248/311.2 |
| 5,470,093 A * | 11/1995 | Kiser | ............... | A61G 5/10 280/304.1 |
| 9,010,769 B1 * | 4/2015 | Munive | ............... | B62B 9/00 280/33.992 |
| 10,252,738 B2 * | 4/2019 | Diep | ............... | B62B 9/20 |
| 2008/0100014 A1 * | 5/2008 | Tripiano | ............... | B62B 9/20 280/47.371 |
| 2016/0311456 A1 * | 10/2016 | Schuman | ............... | B62B 9/20 |
| 2017/0349201 A1 * | 12/2017 | Diep | ............... | B62B 9/203 |

* cited by examiner

*Primary Examiner* — John D Walters (57) ABSTRACT

A stroller apparatus incorporating a steering apparatus for steering through pulling in an abreast or leading position. The steering apparatus includes a telescopic bar to selectively adjust the length as the steering apparatus extends forward from the pushing bar. The connection of the steering apparatus is integrated with the pushing bar, and may be pivotable so as to increasing the steering and navigating of the stroller apparatus by pulling from either side or the front thereof.

15 Claims, 11 Drawing Sheets

STROLLER APPARATUS INCORPORATING APPARATUS FOR STEERING BY PULLING IN A LEADING OR ABREAST POSITION

CROSS-REFERENCE TO RELATED APPLICATIONS

This application is a continuation under 35 U.S.C. § 120 of U.S. patent application Ser. No. 16/112,936, filed 27 Aug. 2018, now issued as U.S. Pat. No. 10,654,507 on 19 May 2020 claiming the benefit under 35 U.S.C. § 119 subject to 37 C.F.R. § 1.78(b) of priority of U.S. provisional application No. 62/531,844, filed 12 Jul. 2017. The contents of each of the two above-identified applications is hereby herein incorporated by reference in its entirety.

BACKGROUND OF THE INVENTION

The present invention relates to a stroller apparatus incorporating an apparatus for steering a push-from-behind transportation device by enabling pulling in an abreast or leading position, thereby increasing visibility, safety and convenience.

When wheeled transportation device steered through pushing from behind—including but not limited to wheelchairs, shopping carts, baby and pet strollers—are pushed into a street crosswalk, through a parking lot, or other high-traffic areas, the typically low-to-the-ground and thus hard-to-see transportation device leads the way. The transportation device is even less likely to be seen when vehicle height is considered, not to mention general driver distractions such as cell phone use, radio channel searching, and the like, Considering that most of these transportation devices in these scenarios are baby strollers carrying small children or infants, the above-mentioned disadvantages pose catastrophic safety concerns.

Prior solutions provide a reversible handle system which leaves a user only with the option to push the stroller from either behind the front or back thereof, but affords no flexibility to transition the users steering approach from pushing to pulling from an abreast or leading position. There are also existing handlebar attachment products that extend or retract in a single backwards direction, towards the person pushing, to give the stroller handle additional length for pushing, but the length, again, is not designed to safely control the stroller from alongside or ahead of the stroller to increase overall visibility, safety and convenience. In short, there are currently no solutions that offer a safer or more convenient alternative to the traditional pushing from behind of the transportation device or a method of transition to a pulling-based steering in an abreast or leading position.

Furthermore, existing transportation device handlebars, handlebar attachments, or attachments to other areas on the transportation devices do not offer a stable area to comfortably grab and control the stroller when pulling it forward. Current transportation device inventions don't work as well as they could without the ability to walk BESIDE a device to increase life-saving visibility and vision of surrounding traffic.

As can be seen, there is a need for an apparatus for steering a push-from-behind transportation device by enabling pulling in an abreast or leading position thereby increasing visibility, safety and convenience through keeping the traditional pushing from behind functionality intact, while adding the ability to easily transition to controlling and steering the stroller from either side or the front.

The steering device embodied in the invention offers a telescopic bar feature for securely and conveniently enabling a user to effortlessly transition to walking beside or ahead of their stroller while maintaining full directional and steering control. By enabling the transition from the traditional method of pushing the stroller only from behind to steering from an abreast or leading position, visibility of the stroller is enhanced for nearby human and vehicle traffic. Likewise, improved vision for the person pushing the stroller is enabled, allowing them to proactively see oncoming traffic. Finally, present invention is adapted to work with any model and style of stroller.

SUMMARY OF THE INVENTION

In one aspect of the present invention, a stroller apparatus incorporates a steering system for a push-from-behind transportation device that includes a telescopic bar connected to a pushing bar of said push-from-behind transportation device; the telescopic bar selectively movable between an extended condition and a retracted condition; the pushing bar being disposed adjacent a rear portion of said push-from-behind transportation device; and a distal end of the telescopic bar extending forwardly adjacent a front portion of said push-from-behind transportation device in the extended condition.

In another aspect of the present invention, the telescopic bar comprises an outer tube and an inner member slidable in the outer tube for selectively moving the telescopic bar between an extended condition and a retracted condition; a quick release mechanism for moving the inner member between a locked engagement and an unlocked engagement relative to the outer tube; a locking mechanism removably locking the telescopic bar to the pushing bar; the pushing bar being disposed adjacent a rear portion of said push-from-behind transportation device; and a distal end of the telescopic bar extending forwardly adjacent a front portion of said push-from-behind transportation device in the extended condition.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring to FIGS. 1 through 15B, the present invention may include a steering apparatus 10 for steering a push-from-behind transportation device 12 by pulling in an abreast or leading position. The steering apparatus 10 may provide a telescoping bar 18 operatively associated with a pushing bar 13 of said transportation device 12 via, in certain embodiments, a load balancing device 14. The load balancing device 14 removably attaches to said pushing bar 13 by way of one or more pushing bar connectors 16 and 16a, or in some embodiments the load balancing device 14 is integrated to the said pushing bar 13. The push-from-behind transportation device 12 includes but is not limited to wheelchairs, shopping carts, baby strollers, pet strollers, and the like.

The telescoping bar 18 may extend from the load balancing device 14 toward a space associated with the middle to front portion of said transportation device 12, wherein it terminates in a hand grip 20. In certain embodiments, the hand grip may be an umbrella handle grip 20. Between the load balancing device 14 and the hand grip 20, the telescoping bar 18 may include an outer tube 26 slidably engaging an inner member 28 dimensioned and adapted to move between a retracted condition and an extended condition. The telescoping bar 18 can be made of aluminum, carbon fiber or other rigid material, and may comprise more than two segments (26 and 28) to be extended and retracted.

The telescoping bar 18 may be rigidly attached to the pushing bar 13 to help lift the transportation device 12 over curbs and obstacles while walking beside or ahead of the transportation device 12. A slight spring-loaded area or hinge 60 may be provided so that the telescoping bar 18 can be slightly non-static, giving a bit of freedom to move the telescoping bar 18 up, down, left and right during operation. The telescoping bar 18 may provide a bend that can also be used to emphasize more pushing instead of pulling from the side or front of the transportation device 12.

A quick release lever 19a and/or clamp 19b may be operatively associated at the interface of the outer tube 26 and inner member 28 for selectively locking them relative to each other by flipping the quick release lever 19a, and thereby adjustably defining the overall length of the telescoping bar 18. Additional ways of expanding and closing the telescoping bar 18 may include the following: (a) clicking a button mechanism to release the telescoping bar 18, then extending the inner member 28 out then pushing it back into the load balancing piece 14 or outer tube 26 until the telescoping bar 18 clicks back into place; (b) twisting and pulling the telescoping bar 18 to slowly release its length and click into place; or (c) using pressure around the inside of the bar connector 23 built into the load balancing device 14, keeping the telescoping bar 18 static and in place until a user decides to extend the telescoping bar 18. Each of the methods will allow a user to extend the telescoping bar 18 enough to allow safe control of the transportation device 12 while walking alongside or ahead of it to increase the device's visibility.

The load balancing device 14 may provide a bar connector 23 for connecting to a proximal end of the telescoping bar 18. The bar connector 23 may be dimensioned and adapted to slidably receive the outer tube 26, wherein the outer tube 26 and the bar connector 23 provide a button lock 24 and button lock hole 24a for making the connection removable and lockable. In some embodiments, see FIG. 15A, the bar connector 51 is joined directly to the pushing bar 13 of the transportation device 12.

Figure 1:
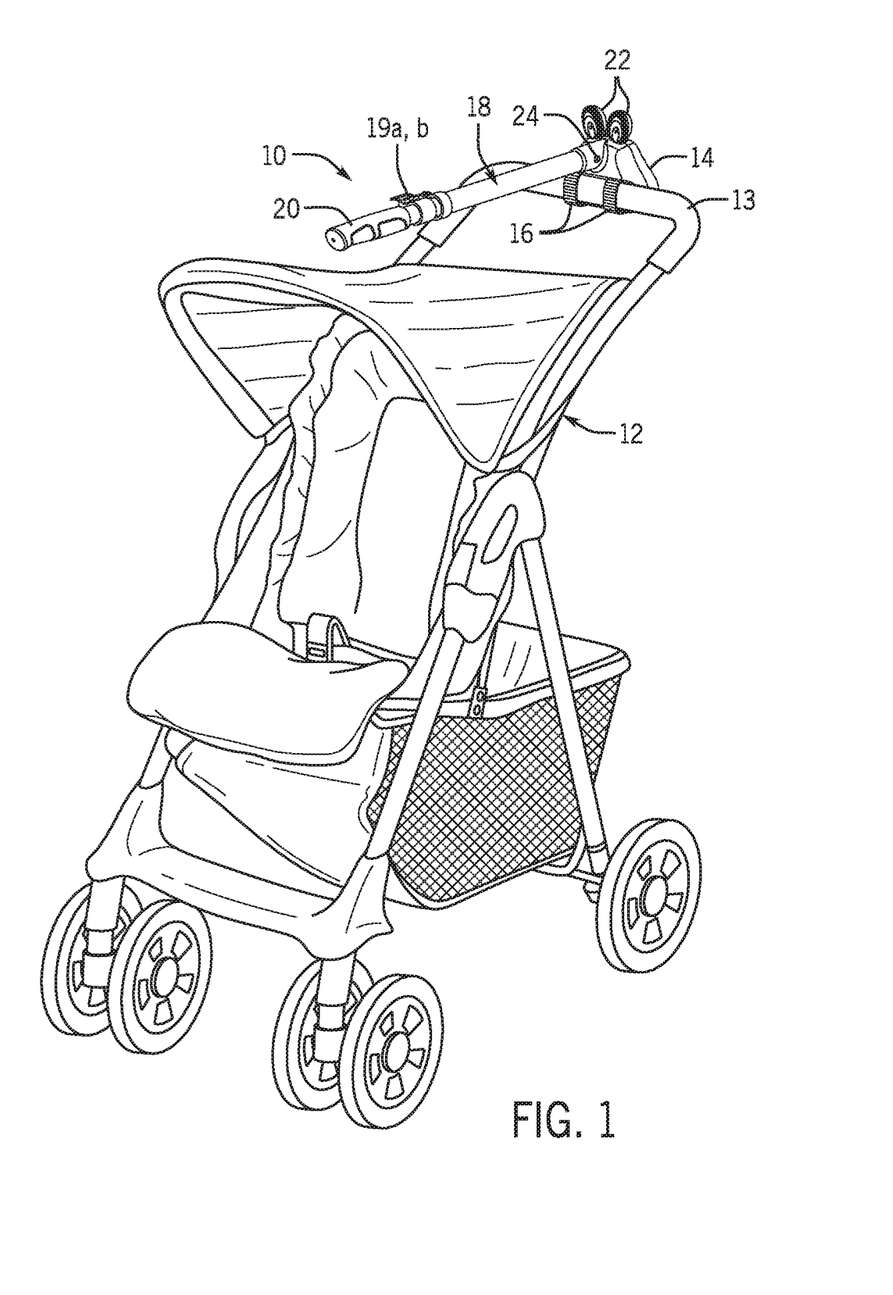
FIG. 1 is a perspective view of an exemplary embodiment of the present invention, shown in use.
Figure 2:
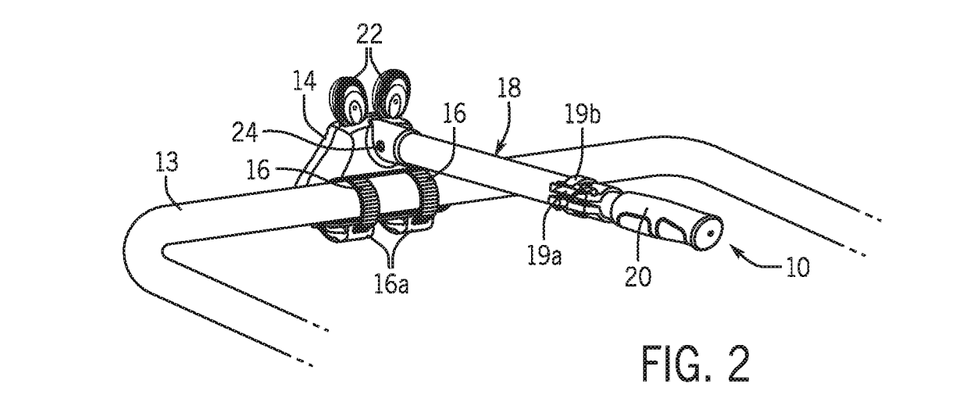
FIG. 2 is a detailed perspective view of an exemplary embodiment of the present invention, shown in use.
Figure 3:
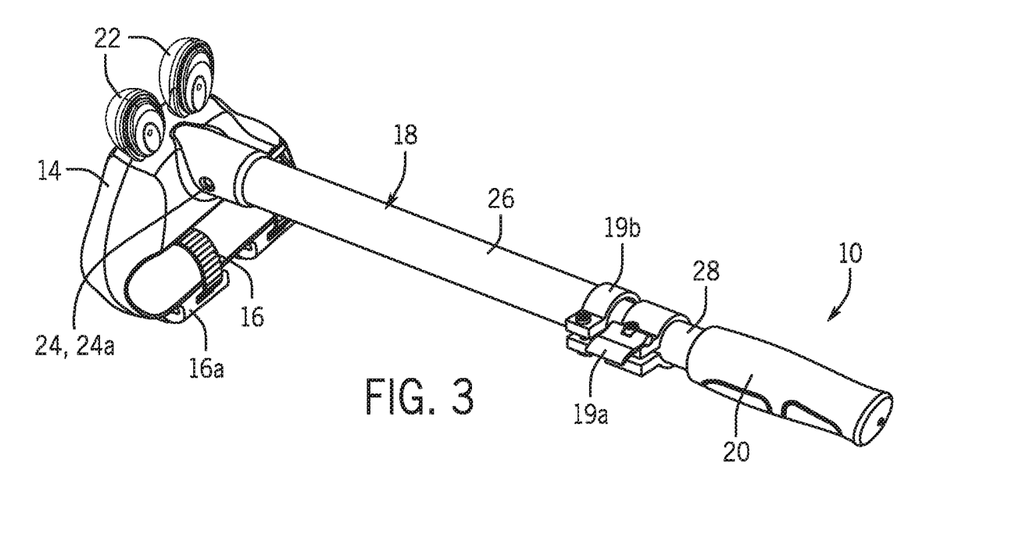
FIG. 3 is a detailed perspective view of an exemplary embodiment of the present invention.
Figure 4:
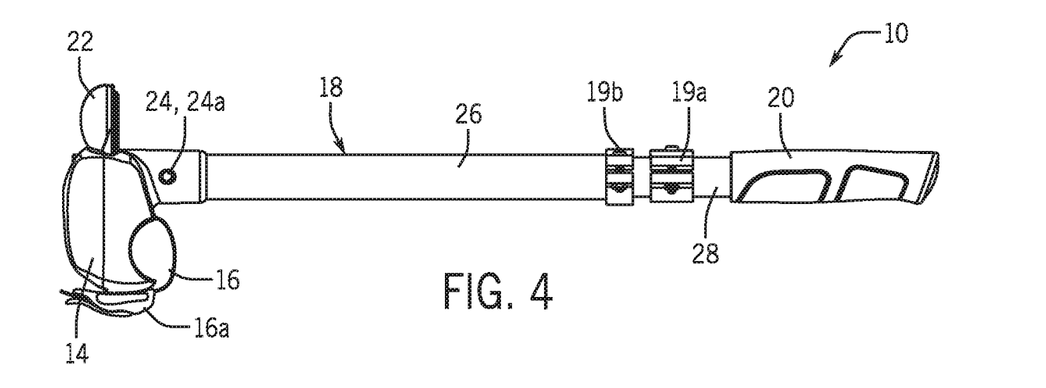
FIG. 4 is a side elevation view of an exemplary embodiment of the present invention.
Figure 5:
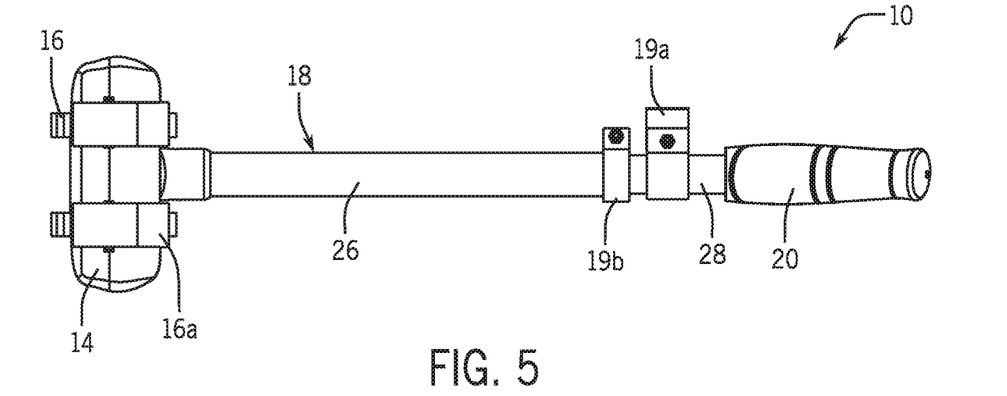
FIG. 5 is a bottom plan view of an exemplary embodiment of the present invention.
Figure 6:
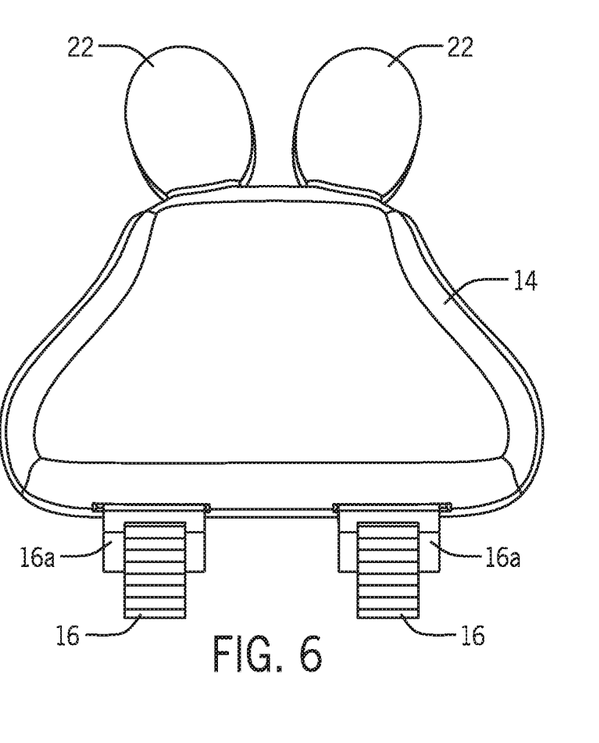
FIG. 6 is a rear elevation view of an exemplary embodiment of the present invention.
Figure 7:
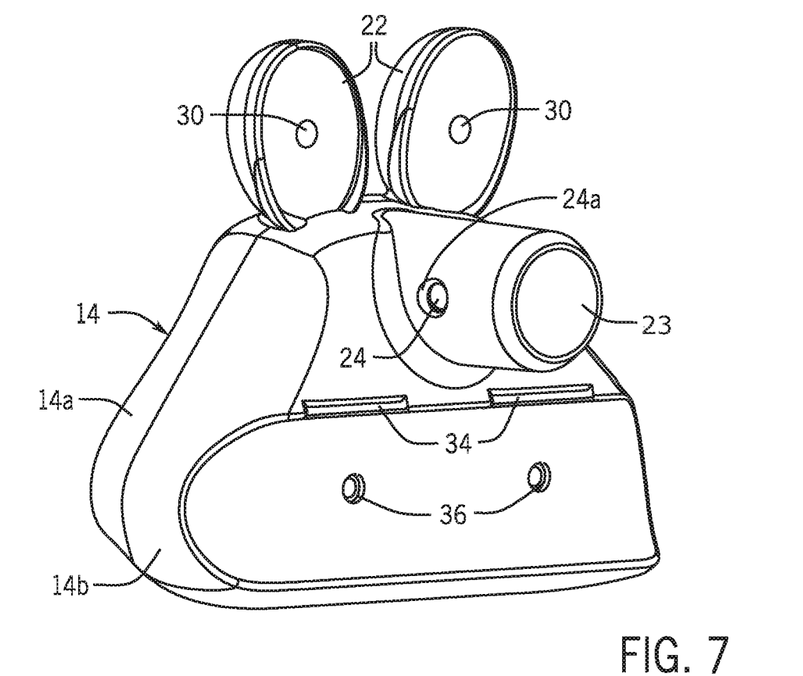
FIG. 7 is a detailed perspective view of an exemplary embodiment of the present invention.
Figure 8:
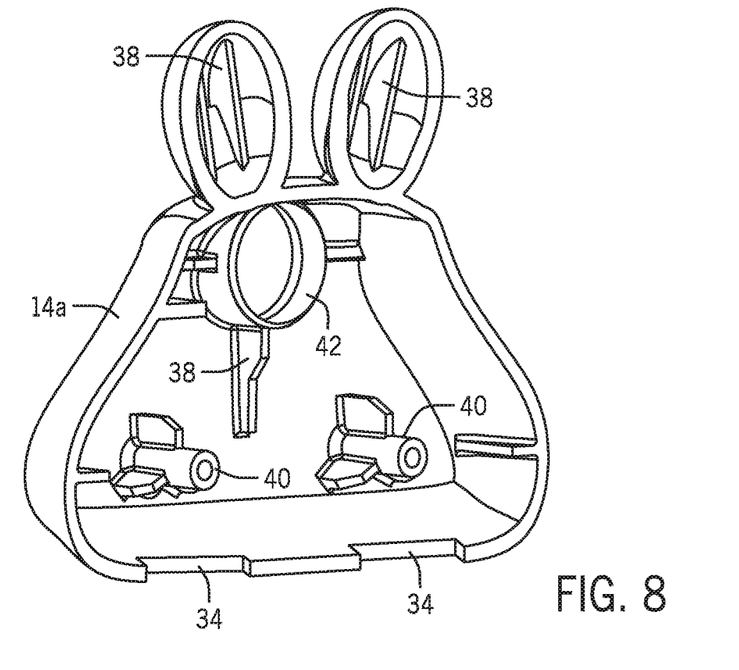
FIG. 8 is a detailed perspective view of an exemplary embodiment of the present invention, illustrating a first portion of a load bearing device housing.
Figure 9:
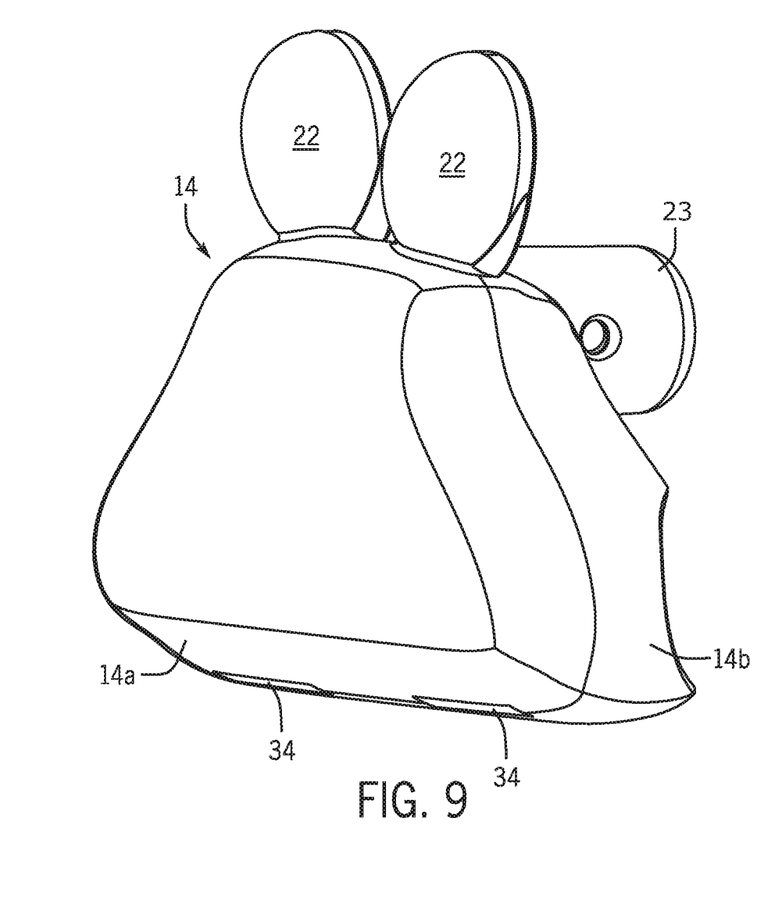
FIG. 9 is a detailed perspective view of an exemplary embodiment of a second housing portion 14*b* of the present invention.
Figure 10:
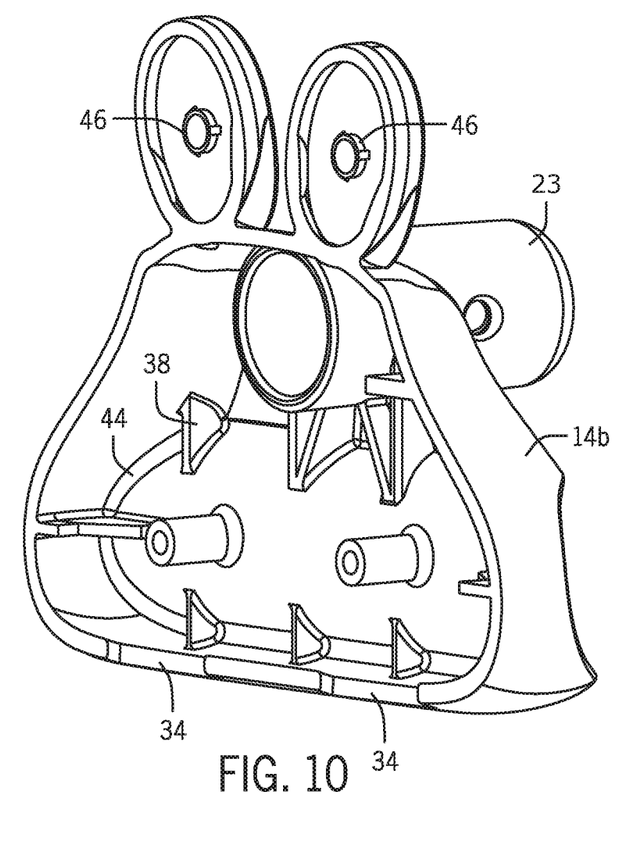
FIG. 10 is a detailed perspective view of an exemplary embodiment of the present invention, illustrating a second portion of the load bearing device housing.
Figure 11:
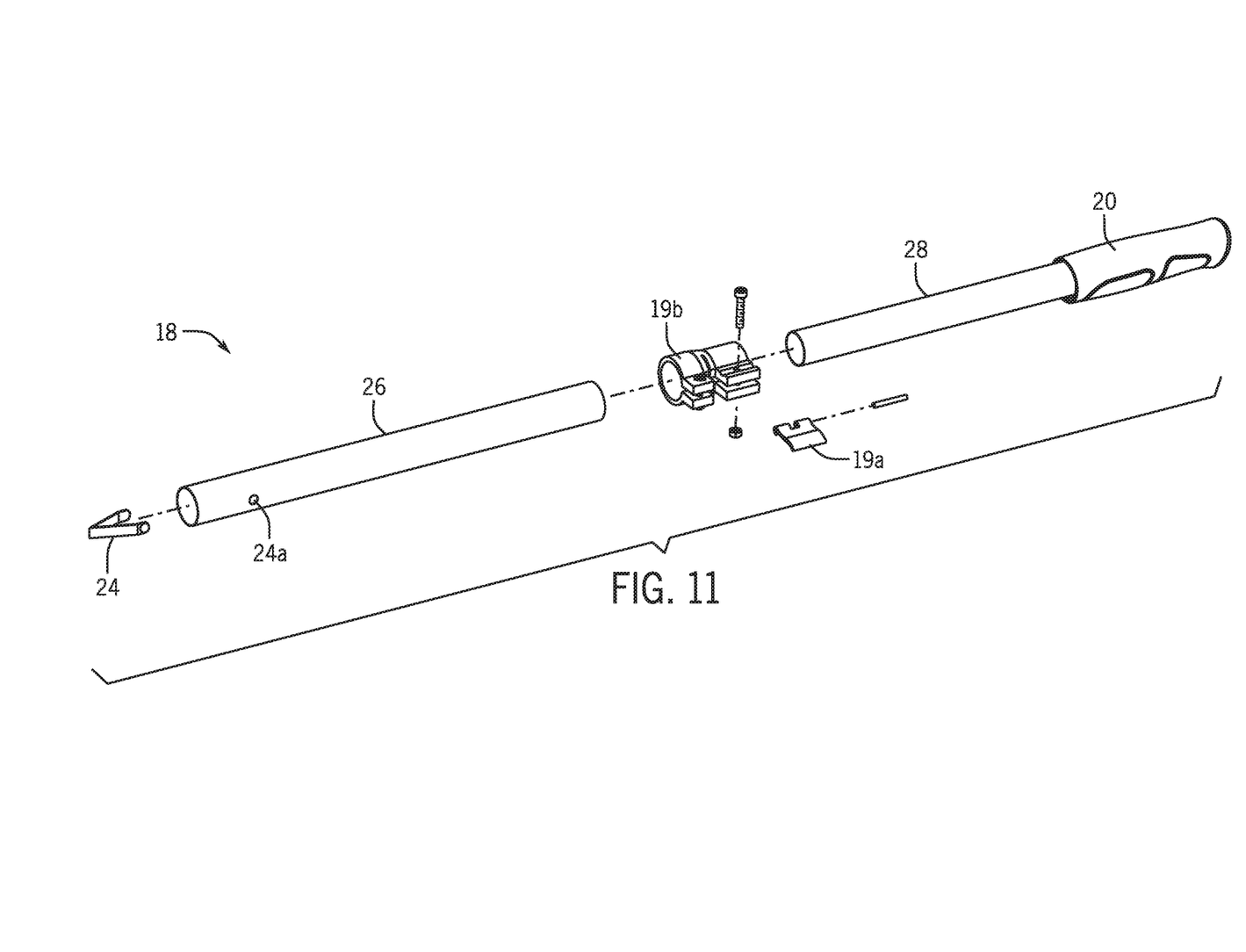
FIG. 11 is an exploded perspective view of an exemplary embodiment of a telescoping bar 18 of the present invention.
Figure 12:
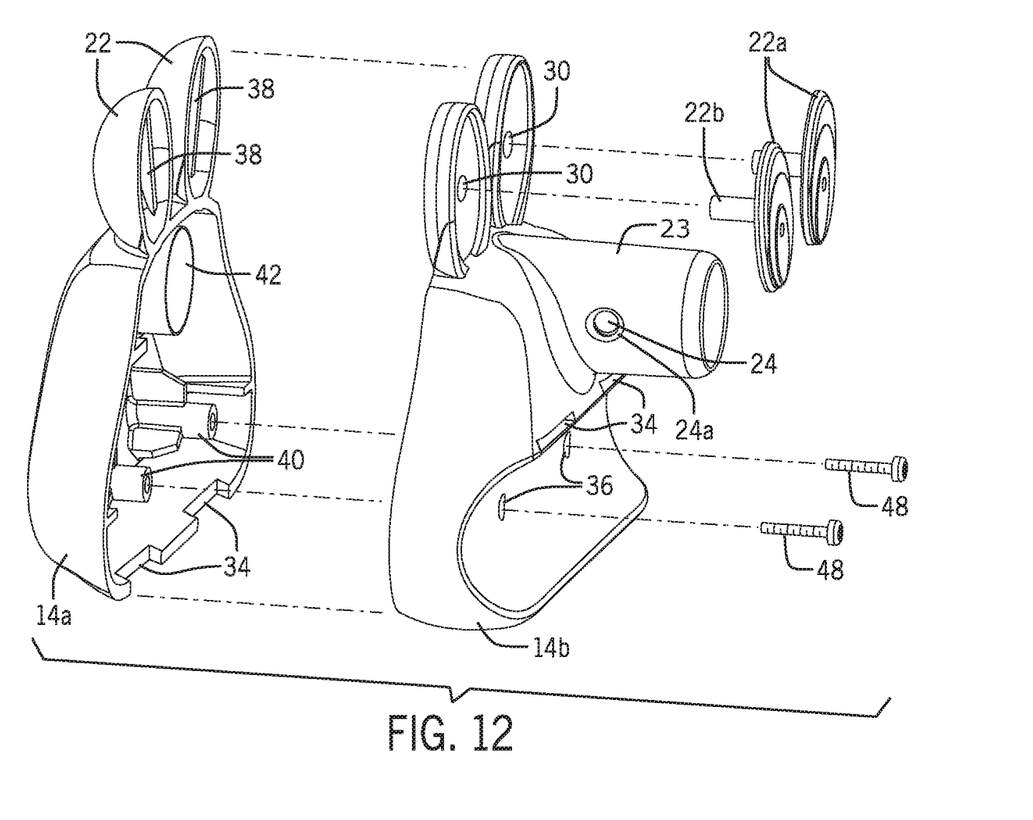
FIG. 12 is an exploded perspective view of an exemplary embodiment of a load bearing device of the present invention.
Figure 13:
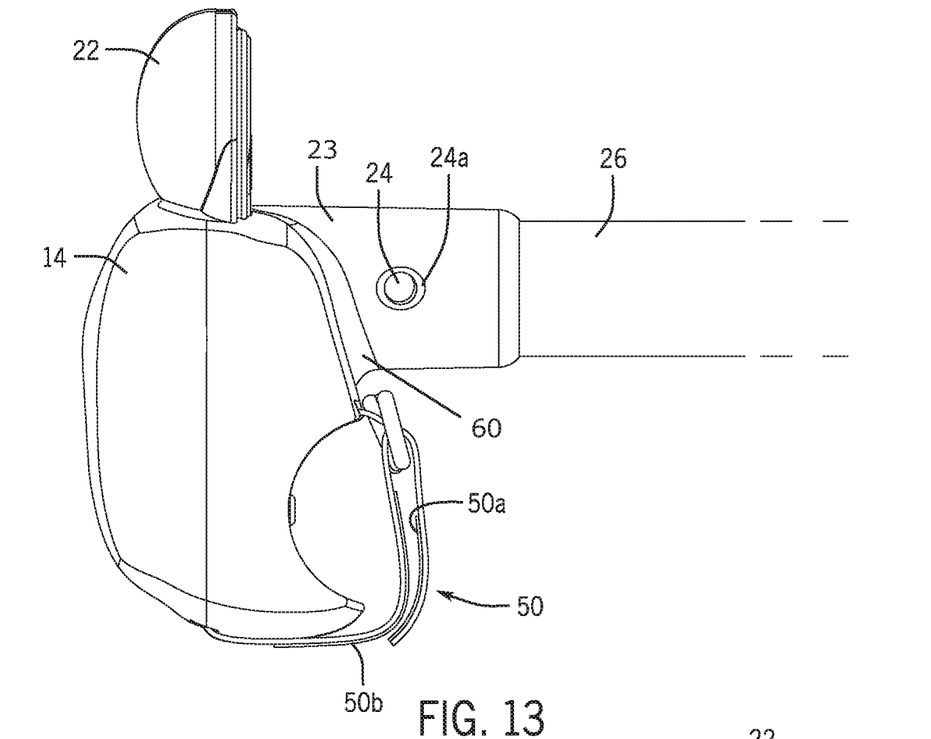
FIG. 13 is a detail side elevation v w of n exemplary embodiment of a load bearing device of the present invention.
Figure 14A:
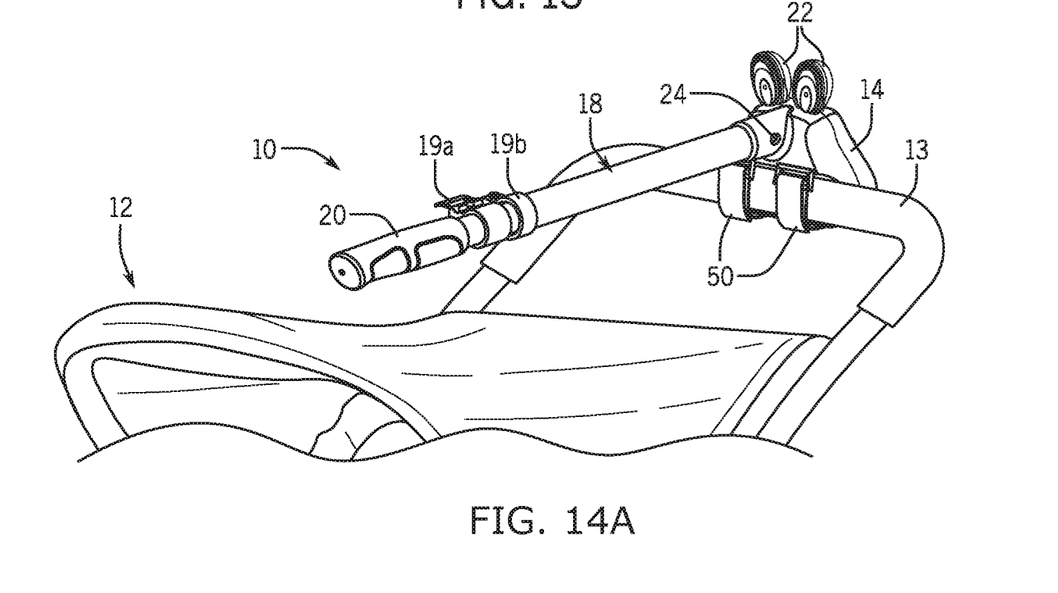
FIG. 14A is a detailed perspective view of an exemplary embodiment of the present invention.
Figure 14B:
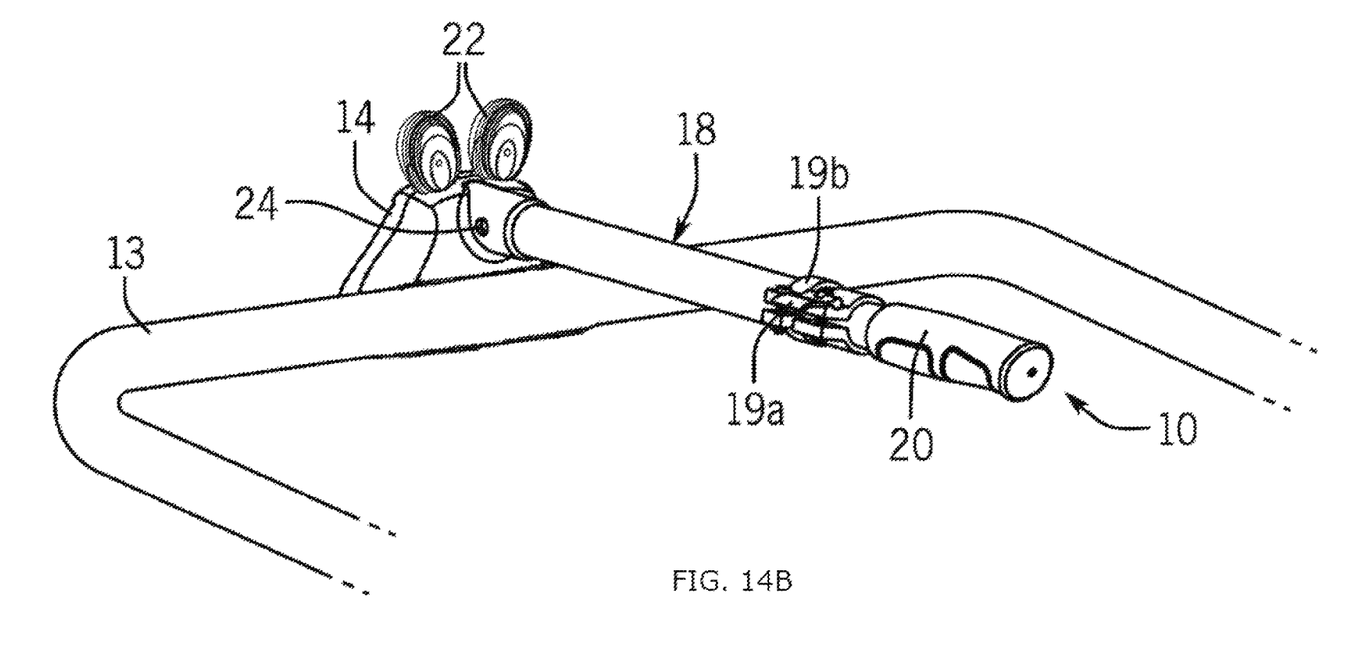
FIG. 14B is a detailed perspective view of an exemplary embodiment of the present invention.
Figure 15A:
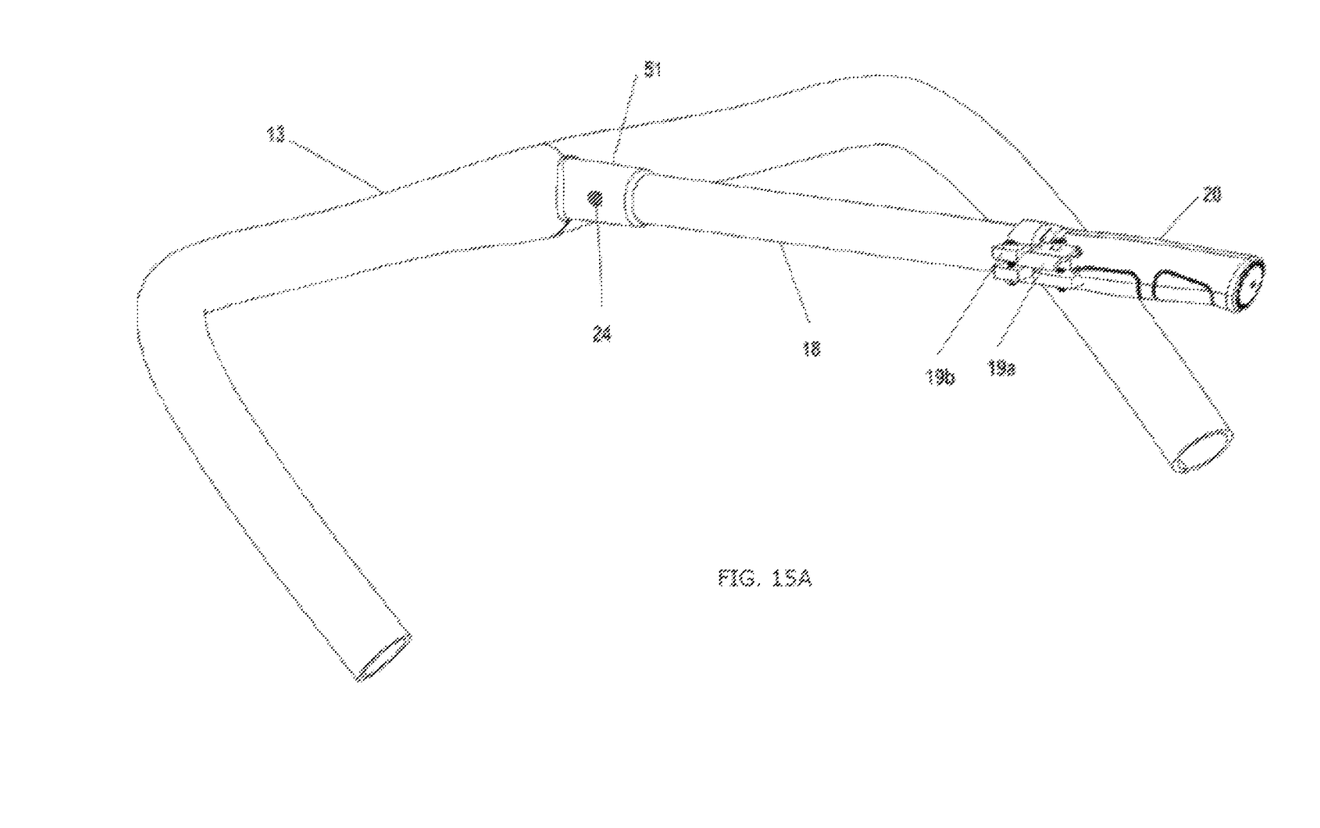
FIG. 15A is a detailed perspective view of an exemplary embodiment of the present invention.
Figure 15B:
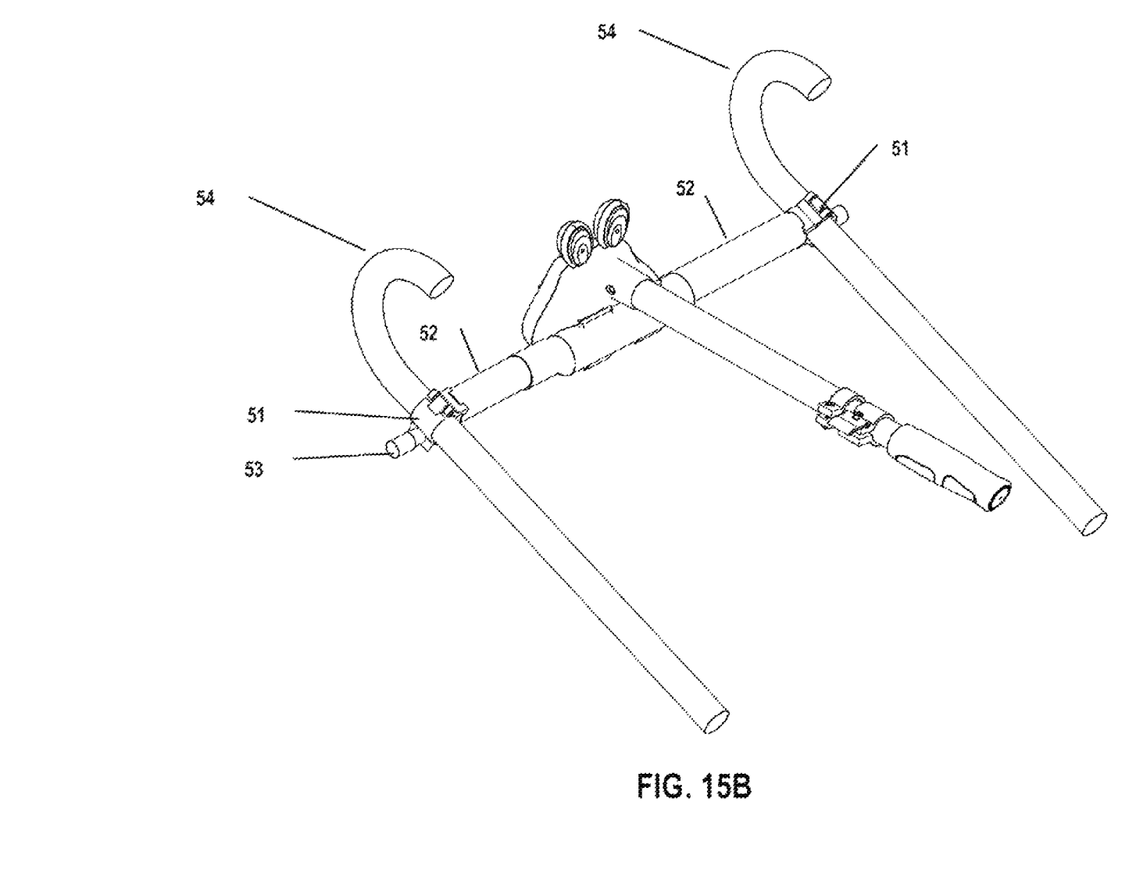
FIG. 15B is a detailed perspective view of an alternative embodiment of the present invention, providing handle clamps 51, telescoping mounting bar 52, clamp knob 53, and umbrella stroller handles 54.

The load balancing device 14 may provide a first housing portion 14a and a second housing portion 14b dimensioned and adapted to mate, providing a housing jointly forming one or more lifting strap slots 34 along a portion of the load balancing device 14. Each lifting strap slot 34 may be dimensioned to receive the pushing bar connectors 16 and 16a, wherein they are lifting strap(s) 16 and strap attachments 16a (e.g., buckles) so that each lifting strap 16 may wrap around the push bar 13 while sliding through the lifting strap slot 34 of the load balancing device 14, thereby stably affixing the latter to the former. The strap attachments 16a enabled moving the strapping 16 between locked and unlocked conditions. In certain embodiments, the pushing bar connectors 16 may be hook and loop fasteners 50 providing mating hook and loop portions 50a/b. In other embodiments the load balancing device 14 is integrated with the push bar 13, as illustrated in FIG. 14B, and so the pushing bar connectors 16 and 16a are unnecessary. The one or more lifting strap slots 34 and/or the strap attachments 16a may be located along a lower, rear, back or any portion of the load bearing device 14 as long as the invention functions are disclosed herein.

The first and second housing portions 14a/b may provide fastener recesses 36 and operatively associated fastener bosses 40 so that one or more fastener 48 can join the first and second housing portions 14a/b when mated. The first and second housing portion 14a/b may provide a bar support 42 operatively aligned with the bar connector 23 for further receiving the outer tube 26 therein. Support ribbing 38 and fillets 44 may supportively engage joints the first and second housing portions 14a/b. The bar support 42 and each slot 34 may spaced apart by two or more inches. Though in other embodiments, the spacing may be less. For example, the present invention may include a single clamp in a middle portion of the load bearing device 14. Ornamental elements 22 may be disposed along upper/external portions of the first and second housing portions 14a/b. The ornamental elements 22 may provide eye-like elements 22a and stems 22b for operatively engaging mounting holes 30 reinforced by stem bosses 46. These ornamental elements 22 enable the load bearing device to take on the appearance of animals, humans, cartoons and other designs allowing for the telescopic bar 18 to become part of the piece's design, and act as either a tail, tongue, trunk, or other bodily component.

A method of using the present invention may include the following. The steering apparatus 10 disclosed above may be provided. A user may first open the pushing bar connectors 16 and 16a to wrap and secure around a transportation device's pushing bar 13 or other solid, non-bendable frame element to allow for safe pulling or pushing from either the side or the front of the transportation device 12. Once the pushing bar connectors 16 and 16a are secured, a user may grab hold of the protruding telescoping bar 18, which is equipped to be easily pulled to a desired length to comfortably walk beside or ahead of the transportation device 12. The hand grip 20 may be manipulated accordingly.

Once the user has safely either walked across a street, intersection, or other area where increased visibility for the transportation device 12 is desired, the telescoping bar 18 can be collapsed into or against the load balancing piece 14 using the quick release lever 19a. The telescoping bar 18 can be easily removed from the load balancing piece 14 by depressing the button lock mechanism 24, or the entire steering apparatus 10 can be removed from a transportation device 12 by loosening the pushing bar connectors 16 and 16a and placing the present invention in storage.

Additionally, the present invention can be used on toys, such as children's bicycles, trikes, etc., warehouse carts, business handcarts or pushcarts to help people walk beside or ahead of their transportation device 12 to be more visible to others, and to guide the device with one-handed control to help open doors more easily, or walk with a free hand to have a drink, use the phone, or other similar activities.

It should be understood, of course, that the foregoing relates to exemplary embodiments of the invention and that modifications may be made without departing from the spirit and scope of the invention as set forth in the following claims.

What is claimed is:

1. A push-from-behind transportation device, comprising:
    a wheel assembly; and
    a push handle assembly having a handle grip component for pushing the push-from-behind transportation device, the handle grip extending substantially above, behind and across a width direction of the wheel assembly; and
    a connector apparatus affixed to the push handle assembly and positioned substantially above, behind and substantially centrally, across the width direction of the wheel assembly, the connector apparatus configured to fixedly receive a proximate end of a control bar extending transversely forward from the handle grip above and across the wheel assembly for use as an auxiliary steering system of the push-from-behind transportation device.

2. The push-from-behind transportation device of claim 1, wherein the push-from-behind transportation device is a stroller apparatus.

3. The push-from-behind transportation device of claim 2, wherein the connector apparatus comprises a socket for receiving the proximate end of the control bar, and the socket further comprising a control bar lock for releasably fixing the control bar in the control bar socket.

4. The push-from-behind transportation device of claim 3, wherein the control bar lock comprises a snap button.

5. The push-from-behind transportation device of claim 1, further comprising the control bar.

6. The push-from-behind transportation device of claim 5, wherein the control bar is selectively and telescopically movable between an extended position distally away from the handle grip and a retracted position proximally nearer the handle grip.

7. The push-from-behind transportation device of claim 6, wherein the control bar comprises an outer tube and an inner member slidable in the outer tube between the extended position and the retracted position.

8. The push-from-behind transportation device of claim 7, wherein the control bar further comprises a positional lock for fixing the inner member relative to the outer tube in either of a locked or unlocked engagement.

9. The push-from-behind transportation device of claim 5, wherein the control bar comprises a handle grip affixed at a distal end of the control bar away from the load body.

10. The push-from-behind transportation device of claim 5, wherein the connector apparatus is pivotable.

11. The push-from-behind transportation device of claim 5, wherein the connector apparatus is integrally affixed to the handle grip.

12. A stroller apparatus, comprising:
    a seat assembly;
    a wheel assembly; and
    a push handle assembly having a handle grip component for pushing the stroller, the handle grip extending substantially above, behind and across a width direction of the seat assembly; and
    a connector apparatus affixed to the push handle assembly and positioned substantially above, behind and substantially centrally, across the width direction of the seat assembly, the connector apparatus configured to fixedly receive a proximate end of a control bar extending transversely forward from the handle grip above and across the seat assembly for use as an auxiliary steering system of the stroller apparatus.

13. The stroller apparatus of claim 12, further comprising the control bar.

14. The stroller apparatus of claim 12, wherein the connector apparatus is integrally affixed to the handle grip.

15. The stroller apparatus of claim 13, wherein the connector apparatus is pivotable.

* * * * *